US012725299B2

(12) United States Patent
Wang et al.

(10) Patent No.: US 12,725,299 B2
(45) Date of Patent: Sep. 1, 2026

(54) THREE-DIMENSIONAL SCANNING SYSTEM AND THREE-DIMENSIONAL SCANNING METHOD

(71) Applicant: SCANTECH (HANGZHOU) CO., LTD., Hangzhou (CN)

(72) Inventors: Jiangfeng Wang, Hangzhou (CN); Shangjian Chen, Hangzhou (CN); Bing Ye, Hangzhou (CN); Zhaolong Wang, Hangzhou (CN); Jun Zheng, Hangzhou (CN)

(73) Assignee: Scantech (Hangzhou) Co, LTD, Hangzhou (CN)

( * ) Notice: Subject to any disclaimer, the term of this patent is extended or adjusted under 35 U.S.C. 154(b) by 284 days.

(21) Appl. No.: 18/244,858

(22) Filed: Sep. 11, 2023

(65) Prior Publication Data

US 2024/0104770 A1 Mar. 28, 2024

Related U.S. Application Data

(63) Continuation of application No. PCT/CN2023/092515, filed on May 6, 2023.

(30) Foreign Application Priority Data

May 13, 2022 (CN) ........................ 202210516699.1

(51) Int. Cl.
*G06T 7/73* (2017.01)
*G06T 17/10* (2006.01)

(52) U.S. Cl.
CPC ................ *G06T 7/74* (2017.01); *G06T 17/10* (2013.01); *G06T 2200/04* (2013.01); *G06T 2200/08* (2013.01); *G06T 2210/56* (2013.01)

(58) Field of Classification Search
CPC ....... G06T 7/74; G06T 17/10; G06T 2200/04; G06T 2200/08; G06T 2210/56; G06T 9/00; G06T 17/00; G01S 7/4815; G01S 7/4817; G01S 17/66; G01S 17/89
See application file for complete search history.

(56) References Cited

U.S. PATENT DOCUMENTS

2016/0153768 A1* 6/2016 Stettner .................. G01S 17/89
356/5.01

FOREIGN PATENT DOCUMENTS

CN 110715618 A 1/2020

* cited by examiner

*Primary Examiner* — Abhishek Sarma
(74) *Attorney, Agent, or Firm* — Osha Bergman Watanabe & Burton LLP

(57) ABSTRACT

A three-dimensional scanning system includes a scanning apparatus configured to acquire first raw image data of a scanning target. The three-dimensional scanning system further includes a first field programmable gate array (FPGA) module provided in the scanning apparatus and configured to perform computational preprocessing on the first raw image data to obtain valid first feature data. The three-dimensional scanning system further includes a modeling terminal connected to the scanning apparatus and configured to perform modeling processing based on the first feature data to generate a three-dimensional model of the scanning target.

18 Claims, 5 Drawing Sheets

140
First light supplementing module
150
First laser module
110
First acquisition module
110
First acquisition module
120
124
First synchronization unit
121
First image signal processing unit
122
First feature processing unit
123
First extraction unit
First field programmable gate array module
160
First storage module
130
Transmission module

THREE-DIMENSIONAL SCANNING SYSTEM AND THREE-DIMENSIONAL SCANNING METHOD

CROSS REFERENCE TO RELATED APPLICATIONS

The application is a bypass application of PCT/CN2023/092515, filed on May 6, 2023, which claims priority to Chinese Patent Application No. 202210516699.1, filed on May 13, 2022 and entitled "THREE-DIMENSIONAL SCANNING SYSTEM AND THREE-DIMENSIONAL SCANNING METHOD." The contents of these applications are incorporated herein by reference in their entirety.

TECHNICAL FIELD

The present application relates to the technical field of three-dimensional scanning, in particular to a three-dimensional scanning system and a three-dimensional scanning method.

BACKGROUND

A traditional three-dimensional scanning system is generally formed by connecting a three-dimensional scanner with a computer of a certain configuration by cables. The three-dimensional scanner is only configured to acquire raw image data and then transmit the raw image data to the computer via the cables. After receiving the raw image data, the computer performs real-time data processing on the raw image data, and finally a three-dimensional model is obtained through processing. With the increasingly high requirements for three-dimensional scanners, in order to improve the performance of three-dimensional scanners, the resolution of a camera is generally increased, which may increase the amount of data transmission. If three-dimensional scanning is still carried out according to the traditional three-dimensional scanning system, the data transmission speed may be greatly decreased and the scanning efficiency may be reduced. In addition, even if all data is transmitted to the computer, the computer may become slow due to such a large amount of data, which may also greatly reduce the scanning efficiency.

SUMMARY

According to various embodiments of the present application, a three-dimensional scanning system and a three-dimensional scanning method are provided.

In a first aspect, one or more embodiments provide a three-dimensional scanning system. The three-dimensional scanning system includes a scanning apparatus and a modeling terminal connected to the scanning apparatus. The scanning apparatus is configured to acquire first raw image data of a scanning target. A first field programmable gate array module is provided in the scanning apparatus, and the first field programmable gate array module is configured to perform computational preprocessing on the first raw image data to obtain valid first feature data.

The modeling terminal is configured to perform modeling processing based on the first feature data to generate a three-dimensional model of the scanning target.

In some embodiments, the first field programmable gate array module includes a first feature processing unit. The first feature processing unit is configured to perform feature recognition on the first raw image data, the feature recognition including marker recognition and/or laser point recognition.

In some embodiments, the first field programmable gate array module further includes a first image signal processing unit connected to the first feature processing unit. The first image signal processing unit is configured to perform image signal processing on the first raw image data for transmitting the processed first raw image data to the first feature processing unit.

In some embodiments, the first field programmable gate array module further includes a first extraction unit. The first extraction unit is connected to the first feature processing unit and configured to perform sub-pixel extraction on a recognition result of feature recognition of the first raw image data.

In some embodiments, the scanning apparatus further includes at least two first acquisition modules and a transmission module.

The at least two first acquisition modules are connected to the first field programmable gate array module and configured to scan the scanning target to acquire the first raw image data of the scanning target and transmit the first raw image data to the first field programmable gate array module.

The transmission module is connected to the first field programmable gate array module and configured to transmit the valid first feature data in the first field programmable gate array module to the modeling terminal.

In some embodiments, the first field programmable gate array module further includes a first synchronization unit. The first synchronization unit is connected to the at least two first acquisition modules and configured to count the first raw image data of the at least two first acquisition modules to cause the first field programmable gate array module to perform synchronous computational preprocessing on the first raw image data acquired at a same time.

In some embodiments, the at least two first acquisition modules are respectively attached to corresponding lenses of the scanning apparatus, and a distance between each of the first acquisition modules and the first field programmable gate array module is not smaller than a first preset threshold.

In some embodiments, the system further includes a tracking apparatus. The tracking apparatus is connected to the modeling terminal and configured to acquire second raw image data of a tracking target.

Second field programmable gate array modules are provided in the tracking apparatus, and the second field programmable gate array modules are configured to perform computational preprocessing on the second raw image data to obtain valid second feature data.

In some embodiments, the tracking apparatus further includes at least two second acquisition modules. The number of the second field programmable gate array modules is same as that of the second acquisition modules.

The at least two second acquisition modules are connected to corresponding second field programmable gate array modules and configured to acquire the second raw image data of the tracking target and transmit the second raw image data to the corresponding second field programmable gate array modules.

In some embodiments, each of the second acquisition modules is attached to a corresponding lens of the tracking apparatus, and a distance between the second field programmable gate array modules and the second acquisition modules is not smaller than a second preset threshold.

In some embodiments, the tracking apparatus further includes a control module. A second synchronization unit is provided in the control module.

The second synchronization unit is connected to each of the second field programmable gate array modules and configured to recognize the second raw image data according to a time stamp corresponding to the second raw image data.

In some embodiments, the second field programmable gate array modules include second feature processing units configured to perform feature recognition on the second raw image data, the feature recognition including marker recognition.

In some embodiments, at least two tracking apparatuses are provided. The at least two tracking apparatuses are connected to the modeling terminal, and configured to acquire third raw image data of tracking targets respectively; and the second field programmable gate array modules are configured to perform computational preprocessing on the third raw image data to obtain valid third feature data.

In a second aspect, one or more embodiments provide a three-dimensional scanning method suitable for the three-dimensional scanning system as described in the first aspect. The method includes: acquiring first raw image data of a scanning target; performing, in a first field programmable gate array module provided in a scanning apparatus, computational preprocessing on the first raw image data to obtain valid first feature data; and performing, in a modeling terminal connected to the scanning apparatus, modeling processing based on the first feature data to generate a three-dimensional model of the scanning target.

Details of one or more embodiments of the present application are set forth in the following accompanying drawings and description in order to make other features, objectives and advantages of the present application more concise and understandable.

BRIEF DESCRIPTION OF DRAWINGS

In order to better describe and illustrate those embodiments and/or examples of the present application disclosed herein, reference may be made to one or more of the accompanying drawings. The additional details or examples used to describe the accompanying drawings should not be considered a limitation on the scope of any one of the disclosed inventions, the embodiments and/or examples currently described, and the optimal mode of these inventions as currently understood.

Figure 1:
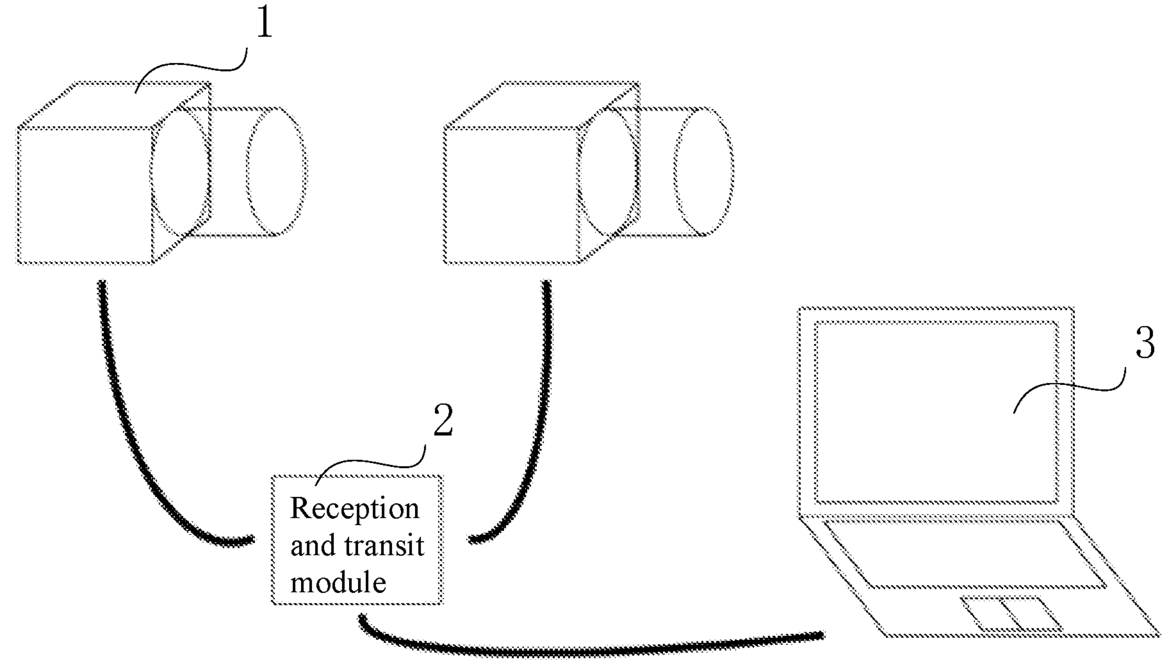
FIG. 1 is a schematic structural diagram of a three-dimensional scanning system in the related art.

In the figures: 1. Camera; 2. Reception and transit module; 3. Computer; 1000. Three-dimensional scanning system; 100. Scanning apparatus; 110. First acquisition module; 120. First field programmable gate array module; 121. First image signal processing unit; 122. First feature processing unit; 123. First extraction unit; 124. First synchronization unit; 130. Transmission module; 140. First light supplementing module; 150. First laser module; 160. First storage module; 200. Modeling terminal; 300. Tracking apparatus; 310. Second acquisition module; 320. Second field programmable gate array module; 321. Second image signal processing unit; 322. Second feature processing unit; 323. Second extraction unit; 330. Control module; 331. Second synchronization unit; 340. Second light supplementing module; 350. Second laser module; 2000. Three-dimensional scanning apparatus; 10. Internal bus; 11. Processor; 12. Memory; 13. Network interface; and 14. Internal memory.

DETAILED DESCRIPTION

In order to make the objectives, technical solutions and advantages of the present application clearer, the present application is described and illustrated below with reference to the accompanying drawings and embodiments. It is to be understood that the specific embodiments described herein are merely illustrative of the present application and are not intended to limit the present application. Based on the embodiments of the present application, all other embodiments obtained by a person of ordinary skill in the art without any creative effort fall within the protection scope of the present application. In addition, it is also to be understood that although the efforts made in such a development process may be complex and lengthy, some changes in design, manufacture, or production based on the technical contents disclosed in the present application are merely conventional technical means to those of ordinary skill in the art related to the contents disclosed in the present application, and should not be construed as inadequate disclosure of the contents disclosed in the present application.

In the present application, "embodiment(s)" indicates that the specific features, structures or characteristics described in conjunction with the embodiment(s) may be included in at least one embodiment of the present application. The phrase at various locations in the description does not necessarily refer to the same embodiment, or an independent or alternative embodiment mutually exclusive of another embodiment. It is to be expressly and implicitly understood by a person of ordinary skill in the art that the embodiments described in the present application may be combined with other embodiments without conflicts.

Unless otherwise defined, technical or scientific terms as involved in the present application shall have the ordinary meanings understood by those of ordinary skill in the technical field to which the present application pertains. In the present application, when an element is described as being "provided on" another element, it may be provided directly on another element or an intermediate element may be present. When an element is considered as being "disposed on" another element, it may be disposed directly on another element or an intermediate element may be present at the same time. When an element is considered as being "fixed to" another element, it may be fixed directly to another element or an intermediate element may be present at the same time. The terms "first", "second", "third", etc., as involved in the present application, are only to distinguish similar objects and do not represent a specific ordering of the objects. The terms used in the specification of the present application are used only for the purpose of describing specific implementations and are not intended to limit the present application. The term "and/or" as used in the present application includes any and all combinations of one or more of the relevant listed items.

The design ideas of the present application are illustrated below.

A traditional three-dimensional scanning system is generally formed by connecting a three-dimensional scanner with a computer of a certain configuration by cables. The three-dimensional scanner is only configured to acquire raw image data and then transmit the raw image data to the computer via the cables. Configuration requirements of the computer are: performing real-time data processing on the raw image data, and performing three-dimensional modeling based on the processed data to obtain a three-dimensional model. As shown in FIG. 1, a three-dimensional scanning system in the related art includes a three-dimensional scanner, high-speed cables, and a computer 3. The three-dimensional scanner includes two cameras 1 and a reception and transit module 2. The cameras 1 have Ethernet interfaces or USB interfaces, and send acquired raw image data to the reception and transit module 2 via high-speed cables. The reception and transit module 2 sends the received raw image data to the computer 3 via a high-speed cable. The computer 3 performs real-time data processing on the raw image data and performs three-dimensional modeling based on the processed data to obtain a three-dimensional model.

However, as a resolution of the cameras 1 in the three-dimensional scanner is increased, the cameras 1 acquire high-resolution image data. Since the high-speed cables need to transmit all of the high-resolution raw image data, a high transmission pressure of the high-speed cables is caused. Currently, the most common transmission methods are Gigabit network transmission and USB 3.0 transmission, where a theoretical bandwidth of the Gigabit network is 1 Gbps and a theoretical bandwidth of USB 3.0 is 5 Gbps. The current commonly used resolutions of the cameras 1 are 1280×1024, 2048×1536, and 2448×2048. During use, the three-dimensional scanner may generally have at least two cameras 1 operating at the same time. When the three-dimensional scanner needs to transmit the raw image data of two cameras 1 at the same time, if the theoretical bandwidth of the Gigabit network is used for transmission, speeds of 50 fps, 20.8 fps, and 13 fps are achieved respectively under the three resolutions of 1280×1024, 2048×1536, and 2448×2048. If the theoretical bandwidth of USB 3.0 is used for transmission, speeds of 200 fps, 83.2 fps, and 52 fps may be achieved respectively under the above three resolutions. During actual use, the Gigabit network and USB 3.0 may fail to achieve theoretical speeds due to cables, interfaces, chips, etc. In fact, the maximum upper limit of USB 3.0 in actual use is generally 3.2 Gbps, so the three-dimensional scanner may not achieve high-frame-rate application. That is, if three-dimensional scanning is still performed according to the traditional three-dimensional scanning system, the data transmission speed may be greatly reduced, and the scanning efficiency may be reduced. In addition, even if all data is transmitted to the computer 3, the computer 3 may become slow due to such a large amount of data, which may also greatly reduce the scanning efficiency.

In view of this, embodiments of the present application provide a three-dimensional scanning system and a three-dimensional scanning method. The system includes a scanning apparatus and a modeling terminal connected to the scanning apparatus. A first field programmable gate array module provided in the scanning apparatus performs computational preprocessing on acquired first raw image data to obtain valid feature data, and then transmit the valid feature data to the modeling terminal. The modeling terminal performs modeling post-processing based on the feature data to generate a three-dimensional model of a scanning target. On the premise of improving the transmission efficiency of the three-dimensional scanning system, the modeling terminal only needs to perform modeling on the valid first feature data, which may further reduce configuration requirements for the first feature data to achieve a demand for high-frame-rate scanning.

Figure 2:
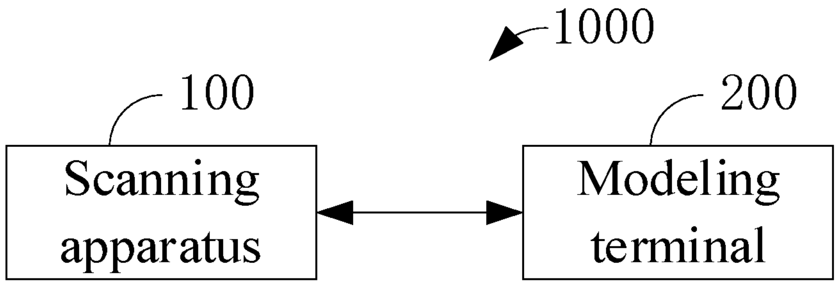
FIG. 2 is an exemplary structural diagram of a three-dimensional scanning system according to one or more embodiments.

One or more embodiments provide a three-dimensional scanning system 1000. FIG. 2 is a schematic structural diagram of the three-dimensional scanning system 1000 according to one or more embodiments. As shown in FIG. 2, the system includes a scanning apparatus 100 and a modeling terminal 200 connected to the scanning apparatus 100. The scanning apparatus 100 is configured to acquire first raw image data of a scanning target. A first field programmable gate array module 120 is provided in the scanning apparatus 100. The first field programmable gate array module 120 is configured to perform computational preprocessing on the first raw image data to obtain valid first feature data. The modeling terminal 200 is configured to perform modeling processing based on the first feature data to generate a three-dimensional model of the scanning target.

Specifically, the scanning apparatus 100 may be a single scanner device or may include a plurality of scanner devices. The plurality of scanner devices may operate independently or may operate in cooperation with each other. The modeling terminal 200 may be one or more computers with a uniform configuration. The scanning apparatus 100 establishes a connection with the modeling terminal 200 via USB 3.0 to achieve data transmission between the scanning apparatus 100 and the modeling terminal 200. The scanning apparatus 100 may also be provided with a transmission module, and establishes a network connection with the modeling terminal 200 via the transmission module to achieve data transmission between the scanning apparatus 100 and the modeling terminal 200.

The first field programmable gate array module 120 provided in the scanning apparatus 100 may take on part of operations. That is, in the process of scanning the scanning target, the scanning apparatus 100 may acquire the first raw image data of the scanning target in real time, then use the first field programmable gate array module 120 provided in the scanning apparatus 100 to perform computational preprocessing on the first raw image data to obtain the valid first feature data, and transmit the valid first feature data to the modeling terminal 200 via USB 3.0 for modeling processing to generate the three-dimensional model of the scanning target, instead of directly transmitting the first raw image data, so that the transmission efficiency may be effectively improved. For example, a resolution of the first raw image data is 2448×2048, and a theoretical speed of transmitting the first raw image data via a cable is 13 fps. In one or more embodiments, the valid first feature data is transmitted. For example, the first feature data is markers each having a size of 50×50, and the first raw image data includes 100 markers. If the first raw image data is 250,000 bytes, then the size of the first feature data accounts for 5% of the first raw image data. According to an upper limit of a transmission speed of the Gigabit network, the frame rate may reach 260 fps.

The first raw image data may be acquired by a first acquisition module 110 in the scanning apparatus 100. The first raw image data includes, but is not limited to, image data, disparity maps, depth maps, or color information, and the like. The first feature data refers to feature data that is valid for three-dimensional modeling. The first feature data includes, but is not limited to, cloud map data, point cloud data, and the like. The modeling terminal 200 performs modeling processing based on the valid first feature data, which may effectively reduce configuration requirements for the modeling terminal 200 and improve the modeling efficiency.

The first field programmable gate array module 120 may be a field programmable gate array (FPGA).

The modeling terminal 200 may be a mobile terminal, a fixed terminal, or a portable terminal, such as a cell phone, a station, a unit, a device, a multimedia computer, a multimedia tablet, an Internet node, a communicator, a desktop computer, a laptop computer, a notebook computer, a netbook computer, a tablet computer, a personal communication system (PCS) device, a personal navigation device, a personal digital assistant (PDA), an audio/video player, a positioning device, a television receiver, a radio broadcast receiver, an e-book device, a gaming device, or any combination thereof, including accessories and peripherals of the devices or any combination thereof.

Computational preprocessing is illustrated in detail below in connection with FIG. 3.

In some embodiments, computational preprocessing at least includes feature recognition, so that the valid first feature data may be extracted.

Specifically, the first field programmable gate array module 120 includes a first feature processing unit 122. The first feature processing unit 122 is configured to perform feature recognition on the first raw image data, the feature recognition including marker recognition and/or laser point recognition.

Specifically, the first feature processing unit 122 may include a first marker recognition subunit and/or a first laser point recognition subunit. That is, the first feature processing unit 122 may include the first marker recognition subunit or the first laser point recognition subunit, or may include the first marker recognition subunit and the first laser point recognition subunit.

The first marker recognition subunit is configured to perform marker recognition on the first raw image data. A specific process may be as follows: an operator is used to traverse the first raw image data in each line to find position coordinates with a gray gradient change meeting a preset first requirement, and the position coordinates are considered as edges of an image; the recognized position coordinates are binarized, the binarized position coordinates are subjected to hole filling and removal of isolated points, and a search for connected domains is started; and the connected domains of the whole raw image are searched for, and the connected domains are output in the form of coordinates, so as to obtain valid marker coordinate data.

The first laser point recognition subunit is configured to perform laser point recognition on the first raw image data. A specific process may be as follows: an operator is used to traverse the first raw image data in each line to find position coordinates with a gray gradient change meeting a preset second requirement, and the position coordinates are considered as edges of an image; and strong edges in the position coordinates are output, and weak edges are accented and then output, so as to obtain valid laser point coordinate data.

By means of the feature recognition described above, the first feature data transmitted from the scanning apparatus 100 to the modeling terminal 200 is the marker coordinate data and/or the laser point coordinate data. Compared to the first raw image data, the two types of first feature data may significantly improve the transmission efficiency under transmission conditions of the system.

In some embodiments, in order to improve recognition accuracy and recognition efficiency, image signal processing may be performed on the first raw image data before feature recognition. Specifically, the first field programmable gate array module 120 further includes a first image signal processing unit 121 connected to the first feature processing unit 122. The first image signal processing unit 121 is configured to perform image signal processing on the first raw image data and transmit the processed first raw image data to the first feature processing unit 122.

The first image signal processing unit 121 may be an image signal processor (ISP). In other embodiments, the first feature processing unit 122 and the first image signal processing unit 121 may be hardware resources such as a logic unit in a field programmable gate array (FPGA), an RAM, a multiplier, or a combination thereof.

A specific process of image signal processing may be: black level compensation, lens shading correction, bad pixel correction, color interpolation (demosaic), Bayer noise removal, automatic white balance (AWB) correction, color correction, gamma correction, color space conversion (RGB to YUV), color noise removal and edge enhancement in a YUV color space, and color and contrast enhancement are performed on Bayer images; automatic exposure control and the like are performed in the middle; and finally image data in a YUV (or RGB) format is output. The first raw image data is firstly subjected to image signal processing, and then the first raw image data processed by image signal processing is transmitted to the first feature processing unit 122 for feature recognition, which is conducive to improving the recognition accuracy and recognition efficiency of feature recognition.

In some embodiments, sub-pixel extraction may be performed on the feature data after feature recognition in order to improve the recognition accuracy. Specifically, the first field programmable gate array module 120 further includes a first extraction unit 123. The first extraction unit 123 is connected to the first feature processing unit 122 and configured to perform sub-pixel extraction on a recognition result of feature recognition of the first raw image.

The sub-pixel extraction may be performed, through an interpolation algorithm, on the first feature data (the marker coordinate data and the laser point coordinate data) obtained by feature recognition. The interpolation algorithm includes, but is not limited to, quadratic interpolation, B-spline interpolation, Chebyshev polynomials interpolation, and the like.

In some embodiments, the scanning apparatus further includes at least two first acquisition modules 110 and a transmission module 130.

The at least two first acquisition modules 110 are connected to the first field programmable gate array module 120 and configured to scan the scanning target to acquire the first raw image data of the scanning target and transmit the first raw image data to the first field programmable gate array module 120.

The transmission module 130 is connected to the first field programmable gate array module 120 and configured to transmit the valid first feature data in the first field programmable gate array module 120 to the modeling terminal 200.

Specifically, at least two first acquisition modules 110 are provided in the scanning apparatus 100. The at least two first acquisition modules 110 are connected to the first field programmable gate array module 120. Parameters of the first acquisition modules 110 are configured based on configuration information of the first field programmable gate array module 120 under control of a control instruction, and the first acquisition modules are triggered to scan the scanning target to acquire the first raw image data. The first acquisition modules 110 may be image sensors. The two image sensors are correspondingly disposed at the positions of the lenses in the scanning apparatus 100, and other devices are disposed in an inner cavity of the scanning apparatus 100. The transmission module 130 may be a cable or a wireless transmission module or the like. Currently, direct transmission of the first raw image data acquired by the at least two first acquisition modules 110 is limited by transmission by cables, and it is difficult to achieve high-frame-rate transmission. Therefore, the first raw image data acquired by the at least two first acquisition modules 110 is transmitted to the first field programmable gate array module for computational preprocessing to obtain the valid first feature data, and then the valid first feature data is transmitted to the modeling terminal 200 via the transmission module 130, thereby reducing the amount of data transmission and achieving high-frame-rate transmission.

The transmission module 130 is configured to receive or transmit data via a network. The network includes a wired network or a wireless network of a terminal. In one example, the transmission module 130 may be a CYPRESS, which is used for communication via USB 3.0.

In some embodiments, the first field programmable gate array module 120 further includes a first synchronization unit 124.

The first synchronization unit 124 is connected to the at least two first acquisition modules 110 and configured to count the first raw image data acquired by the at least two first acquisition modules 110, so as to perform synchronous computational preprocessing on the first raw image data acquired at a same time. Although the first acquisition modules 110 may be simultaneously triggered to perform scanning under the control instruction of the first field programmable gate array module 120, due to differences between hardware and software of the at least two first acquisition modules 110, there may be a time difference in transmission of the first raw image data acquired at a same time to the first field programmable gate array module 120. Therefore, in order to solve this problem, achieve multi-angle synchronous shooting and imaging, and further improve the scanning efficiency, the first synchronization unit 124 is mainly configured to synchronize the at least two first acquisition modules 110.

A specific synchronization process may be as follows. Initially, the parameters of the two first acquisition modules 110 are configured under the control of the control instruction of the first field programmable gate array module 120. Then, the two first acquisition modules 110 are simultaneously triggered to scan the scanning target under the control of the control instruction of the first field programmable gate array module 120 to acquire respective first raw image data. Then, the first field programmable gate array module 120 marks a first frame of the received first raw image data of one of the first acquisition modules 110 as 1, a second frame of this first raw image data as 2, and so on for the subsequent frames. The first field programmable gate array module 120 marks a first frame of the received first raw image data of the other of the first acquisition modules 110 as 1, a second frame of this first raw image data as 2, and so on for the subsequent frames. Finally, whether the first raw image data is acquired at a same time is determined by comparing whether the counts are same. For example, if both counts of the first raw image data are 2, the first raw image data is acquired at a same time.

It is to be noted that the first extraction unit 123 and the first synchronization unit 124 may be hardware resources such as logic units in a field programmable gate array (FPGA), an RAM, a multiplier and the like, or a combination thereof, which is not limited herein.

Since the scanning apparatus 110 is not limited to a single scanner device, but may include a plurality of scanner devices, the plurality of first acquisition modules 110 may be provided on a single scanner device, or may be provided on a plurality of scanner devices, respectively.

In some embodiments, the plurality of first acquisition modules 110 may be provided on a single scanner device, and other devices are also provided on the scanner device. Traditionally, a first acquisition module and a first field programmable gate array module are mounted together. Because the first acquisition module and the first field programmable gate array module are both components that generate a lot of heat, and the first acquisition module needs to be provided at a lens, all heat generated in the scanning apparatus may be directly transmitted to the lens through a housing, and a change in temperature may cause uncontrollable changes in the accuracy of raw image data captured. A current common practice is to measure a temperature curve based on the raw image data and the temperature change, and algorithmically compensate for the accuracy of the raw image data. However, this method is very time-consuming, and it is difficult for a final result to meet ideal expectations.

In one or more embodiments, the at least two first acquisition modules 110 are respectively attached to corresponding lenses of the scanning apparatus 100, respectively, and a distance between each of the first acquisition modules 110 and the first field programmable gate array module 120 is not smaller than (greater than or equal to) a first preset threshold. The first acquisition modules 110 are separated from the first field programmable gate array module 120, and the distance between each of the first acquisition modules 110 and the first field programmable gate array module 120 is not smaller than the first preset threshold. The first field programmable gate array module 120 is provided in the inner cavity of the scanning apparatus 100. The first preset threshold indicates that the first field programmable gate array module 120 is at the same distance from the two first acquisition modules 110, and the first field programmable gate array module 120 is at the farthest distance from one of the first acquisition modules 110. In one or more embodiments, only the heat of the first acquisition modules 110 may be transferred to the lenses, and the heat of the first field programmable gate array module 120 in the inner cavity may be transferred to a skeleton of the scanning apparatus 100 for heat dissipation. Compared with traditional solutions, the impact of heat on the accuracy of the raw image data is alleviated. Additionally, in one or more embodiments, the accuracy of the raw image data may be compensated for algorithmically by combining with the temperature curve measured based on the raw image data and the temperature change, which will not be limited.

In some embodiments, the scanning apparatus further includes a first storage module 160. The first storage module 160 is provided in the inner cavity of the scanning apparatus 100 and connected to the first field programmable gate array module 120 for receiving and storing the first raw image data. The first storage module 160 is mainly configured to cache the first raw image data. Since the first storage module 160 is also a heat-generating element, by providing the first storage module in the inner cavity, heat of the first storage module may be prevented from being transferred to the lens and affecting the acquisition accuracy of the raw image data. Optionally, the first storage module 160 may be a memory.

In some embodiments, the scanning apparatus further includes first light supplementing modules 140 and a first laser module 150.

The first light supplementing modules 140 are connected to the first field programmable gate array module 120 and configured to supplement light for scanning of the scanning target. Each of the first light supplementing modules 140 supplements light for a scanning operation of the corresponding first acquisition module 110, thereby improving the clarity of the acquired first raw image data. Specifically, the first light supplementing modules 140 may supplement light during the scanning of the scanning target under a control instruction of the first field programmable gate array module 120.

The first laser module 150 is connected to the first field programmable gate array module 120 and configured to emit a laser pattern onto the scanning target. Excited laser light is projected onto the scanning target to form laser lines or other patterns. Specifically, the first laser module 150 may project the laser light onto the scanning target to form a laser pattern, such as laser lines, under a control instruction of the first field programmable gate array module.

The three-dimensional scanning system 1000 formed by the various devices described above may be a handheld three-dimensional scanner.

During scanning, a scanning process may be as follows. Initially, the first field programmable gate array module 120 establishes a USB connection with the modeling terminal 200 via the transmission module 130, and the modeling terminal 200 sends the configuration information (exposure time, a frame rate, a gain, etc.) and the control instructions (instructions of starting to trigger, stop triggering, etc.) to the first field programmable gate array module 120. Then, the first field programmable gate array module 120 triggers a fill light and a laser device to operate according to the received configuration information and control instructions, and starts the first acquisition modules 110. Then, the first acquisition modules 110 transmit the acquired first raw image data to the first field programmable gate array module 120, and the first field programmable gate array module 120 performs computational preprocessing on the received first raw image data to obtain the valid first feature data. Finally, the valid first feature data is transmitted to the modeling terminal 200 via the transmission module 130 for modeling processing to generate the three-dimensional model of the scanning target. Alternatively, the control instructions in the above embodiments may also be sent directly by the modeling terminal.

It is to be noted that the first feature data in the above embodiments includes marker feature data and laser point feature data. The marker feature data is used for achieving positioning of the handheld three-dimensional scanner, and the laser point feature data is used for reconstructing three-dimensional information of a surface of a scanned object.

Figures 3, 4:
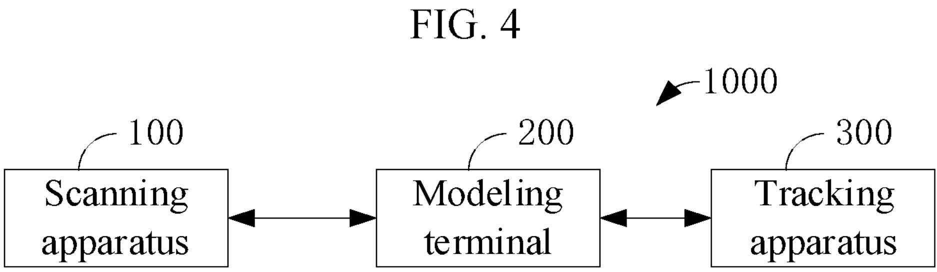
FIG. 3 is a schematic structural diagram of a scanning apparatus according to one or more embodiments.
FIG. 4 is an exemplary structural diagram of a three-dimensional scanning system according to one or more embodiments.

In some embodiments, as shown in FIG. 4, the three-dimensional scanning system 1000 further includes a tracking apparatus 300. The tracking apparatus 300 is connected to the modeling terminal 200 and configured to acquire second raw image data of a tracking target.

Second field programmable gate array modules 320 are provided in the tracking apparatus 300. The second field programmable gate array modules 320 are configured to perform computational preprocessing on the second raw image data to obtain valid second feature data.

In one or more embodiments, the three-dimensional scanning system may be a tracking type three-dimensional scanning system and includes a tracking apparatus and a scanning apparatus. The scanning apparatus 100 is generally provided with markers. The tracking apparatus 300 positions the scanning apparatus 100 by recognizing the markers on the scanning apparatus 100, so as to obtain the second raw image data and track a pose of the scanning apparatus 100.

It is to be noted that during scanning, the scanning apparatus is configured to acquire surface data of the scanned object, i.e., to acquire the first raw image data, from which the first feature data is extracted for subsequent three-dimensional reconstruction. The tracking apparatus is configured to track the pose of the scanning apparatus in real time. That is, when the scanning apparatus acquires the surface data of the measured object, the tracking apparatus synchronously acquires data of the markers disposed on the scanning apparatus, i.e., the second raw image data. The second raw image data is processed to obtain the second feature data. By combining the first feature data obtained by the scanning apparatus with the second feature data obtained by the tracking apparatus, the scanning data is finally converted to a coordinate system of the tracking apparatus, thus achieving tracking type three-dimensional scanning.

Specifically, the tracking apparatus 300 may be a single tracker device or may include a plurality of tracker devices. The plurality of tracker devices may operate independently or may operate in cooperation with each other. The tracking apparatus 300 establishes a connection with the modeling terminal 200 via USB 3.0 to achieve data transmission between the tracking apparatus 300 and the modeling terminal 200. The tracking apparatus 300 may also be provided with a control module, and establishes a network connection with the modeling terminal 200 via the control module to achieve data transmission between the tracking apparatus 300 and the modeling terminal 200.

Similar to the first field programmable gate array module 120 provided in the scanning apparatus 100, the second field programmable gate array module 320 provided in the tracking apparatus 300 may also take up a part of operations, for example, performing computational preprocessing. That is, in the process of tracking the tracking target, the tracking apparatus 300 may acquire the second raw image data of the tracking target in real time, then use the second field programmable gate array modules 320 provided in the tracking apparatus 300 to perform computational preprocessing on the second raw image data to obtain the valid second feature data, and then transmit the valid second feature data to the modeling terminal 200 via USB 3.0, instead of directly transmitting the second raw image data, so that the transmission efficiency may be effectively improved. The tracking target here refers to the scanning apparatus. Alternatively, the tracking target may also include a measurement apparatus such as a light pen.

Accordingly, the modeling terminal 200 performs modeling processing based on the first feature data and the second feature data to generate the three-dimensional model. Specifically, by combining the first feature data acquired from the first raw image data and the second feature data acquired from the second raw image data, the scanning data of the scanning target may be converted to the coordinate system of the tracking apparatus, so as to achieve tracking type scanning. In one or more embodiments, the first feature data refers to marker feature data and laser point feature data, and the second feature data refers to marker feature data of the markers on the scanning apparatus. In different embodiments, the first feature data and the second feature data refer to different types of feature data.

It is to be noted that the tracking target refers to a target object to be tracked within a field of view of the tracking apparatus 300. The tracking target may include an object to be scanned, the scanning apparatus 100, a marker auxiliary workpiece, and the like. The scanning target refers to a target object to be scanned within a field of view of the scanning apparatus 100. The scanning target may include an object to be scanned, a marker auxiliary workpiece, and the like.

Devices in the tracking apparatus 300 and devices in the scanning apparatus 100 are same if having the same name, the difference being that there is a difference in data processing, mounting position, or number. For example, the first field programmable gate array module 120 and the second field programmable gate array modules 320 are both field programmable gate array modules, and the difference is that a single field programmable gate array module is provided in the scanning apparatus 100 and connected to the two first acquisition modules, while two field programmable gate array modules are provided in the tracking apparatus 300, each corresponding to a second acquisition module. Alternatively, the specific number of the field programmable gate array modules may be determined according to the internal structure layout of a scanner. The differences of other devices are not illustrated here.

The components of the tracking apparatus 300 are illustrated in detail below in conjunction with FIG. 5 and FIG. 6.

In some embodiments, the second field programmable gate array module 320 includes a second feature processing unit 322. The second feature processing unit 322 is configured to perform feature recognition on the second raw image data, the feature recognition including marker recognition. In other embodiments, the second raw image data may also be subjected to laser point recognition, or to marker recognition and laser point recognition.

The second feature processing unit 322 may be similar to the first feature processing unit 122 above, which will not be repeated herein.

In some embodiments, the second field programmable gate array module 320 further includes a second image signal processing unit 321 connected to the second feature processing unit 322. The second image signal processing unit 321 is configured to perform image signal processing on the second raw image data and transmit the processed second raw image data to the second feature processing unit 322.

The second image signal processing unit 321 may be similar to the first image signal processing unit 121 above, which will not be repeated herein.

In some embodiments, the second field programmable gate array module 320 further includes a second extraction unit 323. The second extraction unit 323 is connected to the second feature processing unit 322 and configured to perform sub-pixel extraction on a recognition result of feature recognition of the second raw image data.

The second extraction unit 323 may be similar to the first extraction unit 123 above, which will not be repeated herein.

In some embodiments, the tracking apparatus 300 further includes at least two second acquisition modules 310. The number of the second field programmable gate array modules 320 is same as that of the second acquisition modules 310.

The at least two second acquisition modules 310 are connected to corresponding second field programmable gate array modules 320 and configured to acquire the second raw image data of the tracking target and transmit the second raw image data to the corresponding second field programmable gate array modules 320.

Specifically, each of the second field programmable gate array modules 320 is connected to a corresponding second acquisition module 310, and each of the second field programmable gate array modules 320 separately controls a second acquisition module 310. For example, parameters of the corresponding second acquisition modules 310 are configured based on configuration information of the second field programmable gate array modules, and after the configuration, the corresponding second acquisition modules 310 are triggered by control instructions of the second field programmable gate array modules to track and scan the tracking target, so as to acquire the second raw image data. The second acquisition modules 310 may be image sensors. The two image sensors are correspondingly disposed at the positions of the lenses in the tracking apparatus 300, and other devices are disposed in an inner cavity of the tracking apparatus 300. The second raw image data acquired by the at least two second acquisition modules 310 is transmitted to the corresponding second field programmable gate array modules 320 for computational preprocessing to obtain the valid second feature data, and then the valid second feature data is transmitted to the modeling terminal 200, thereby reducing the amount of data transmission and achieving the purpose of high-frame-rate transmission.

It is to be noted that the tracking type three-dimensional scanning system includes the tracking apparatus 300 and the scanning apparatus 100. In some embodiments, the scanning apparatus 100 directly transmits the acquired first raw image data to the modeling terminal 200, and the tracking apparatus 300 performs computational preprocessing on the acquired second raw image data and then transmits the acquired second feature data to the modeling terminal 200, so as to acquire the three-dimensional model. In other embodiments, the scanning apparatus 100 performs computational preprocessing on the acquired first raw image data and then transmits the acquired first feature data to the modeling terminal 200, and the tracking apparatus 300 directly transmits the acquired second image data to the modeling terminal 200, so as to acquire the three-dimensional model. In yet other embodiments, the scanning apparatus 100 and the tracking apparatus 300 perform computational preprocessing on the acquired first raw image data and second raw image data, respectively, and then transmit the first feature data and the second feature data to the modeling terminal 200, so as to acquire the three-dimensional model.

Since the tracking apparatus 300 is not limited to a single tracker device, but may include a plurality of tracker devices, the plurality of second acquisition modules 310 may be provided on a single tracker device, or may be provided on a plurality of tracker devices, respectively.

In some embodiments, the plurality of second acquisition modules 310 may be disposed on a single tracker device, and other devices are also disposed on the tracker device. Thus, each of the second acquisition modules 310 is attached to a corresponding lens of the tracking apparatus 300. A distance between the second field programmable gate array modules 320 and the second acquisition modules 310 is not smaller than (greater than or equal to) a second preset threshold. The second acquisition modules 310 are respectively separated from the second field programmable gate array modules 320, where the second field programmable gate array modules 320 are disposed in the inner cavity of the tracking apparatus 300, and the second acquisition modules 310 are attached to the lenses of the tracking apparatus 300.

The second preset threshold indicates that the distance between the second field programmable gate array modules 320 and the two second acquisition modules 310 is greater than or equal to the second preset threshold. In one or more embodiments, only heat of the second acquisition modules 310 may be transferred to the lenses, and heat of the second field programmable gate array modules 320 in the inner cavity may be transferred to a skeleton of the tracking apparatus for heat dissipation. Compared with traditional solutions, the impact of heat on the accuracy of the tracking apparatus is alleviated. Additionally, in one or more embodiments, the accuracy of the tracking apparatus may be compensated for algorithmically by combining with the temperature curve measured based on the raw image data and the temperature change, which will not be limited.

In some embodiments, the tracking apparatus 300 further includes a control module 330. A second synchronization unit 331 is provided in the control module 330. The second synchronization unit 331 is connected to each of the second field programmable gate array modules 320 and configured to recognize the second raw image data according to a time stamp corresponding to the second raw image data.

Specifically, the control module 330 may be an advanced RISC machine (ARM) processor. The second synchronization unit 331 may achieve synchronization via a cable or through a wireless synchronization device. For example, the wireless synchronization device performs synchronization through a pulse width modulation (PWM) synchronization signal.

A specific synchronization process may be as follows: the second acquisition modules 310 are connected to the second field programmable gate array modules 320 respectively through a predefined communication protocol; and during transmission of the second raw image data, time stamps corresponding to the second raw image data may be stored in a specified field of the communication protocol. Each of the second field programmable gate array modules 320 also achieves data interaction with the second synchronization unit 331 through the communication protocol, and transmits the time stamps and the second raw image data to the second synchronization unit 331. Thus, the second synchronization unit 331 may parse the time stamps corresponding to the second raw image data from the communication protocol. Whether the second raw image data is acquired at a same time is determined by comparing whether the time stamps are same.

The predefined communication protocol indicates that a field in a format of the communication protocol is specified to store the time stamps. Accordingly, the time stamps corresponding to the second raw image data may be parsed from the communication protocol.

Figure 5:
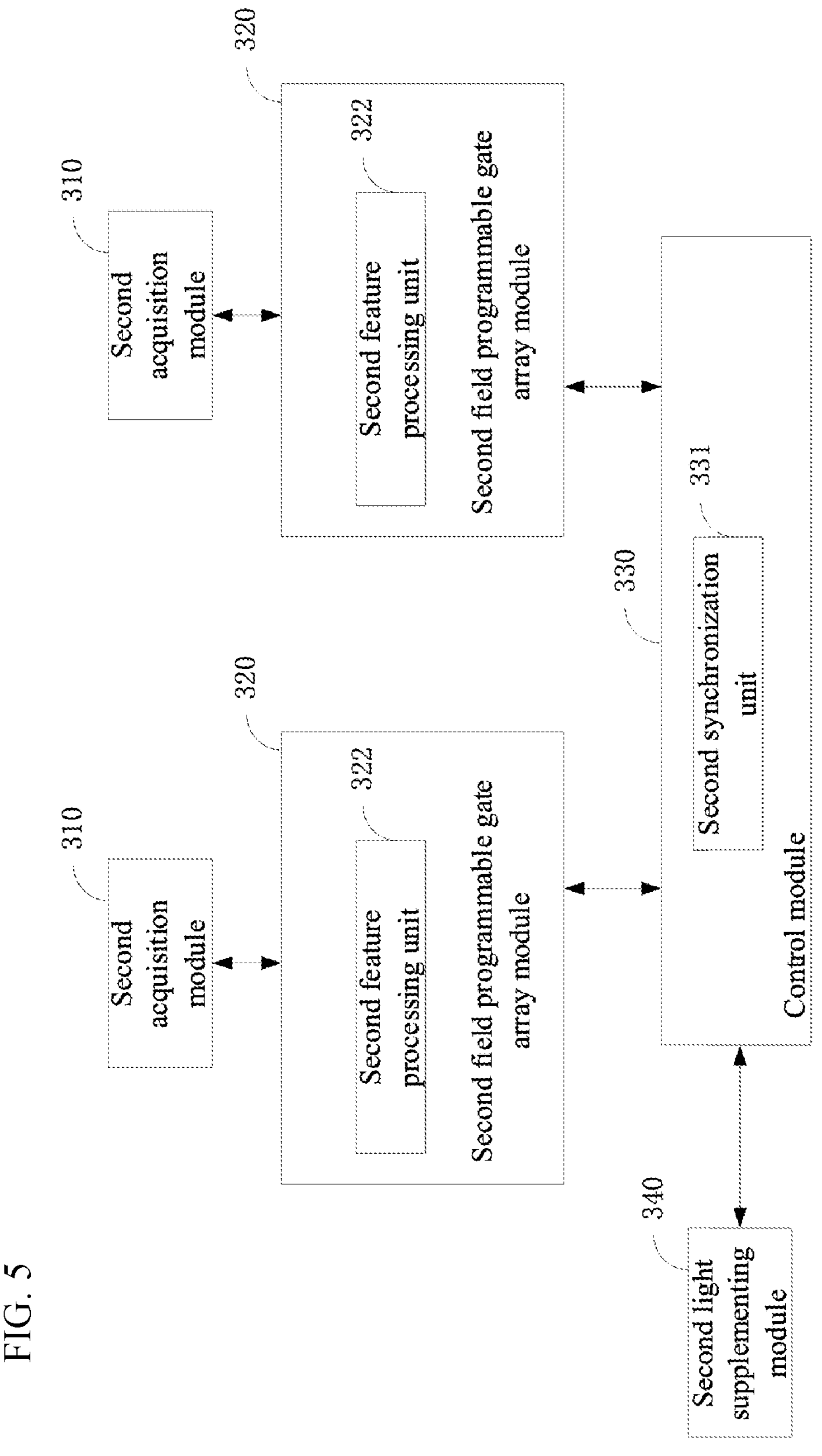
FIG. 5 is a schematic structural diagram of a tracking apparatus according to one or more embodiments.

Referring to FIG. 5, in some embodiments, the tracking apparatus 300 does not include a laser module and may not project a laser pattern to the scanned object, but only tracks the pose of the scanning apparatus 100 in real time. In this case, the second feature data extracted from the second raw image data acquired by the tracking apparatus only includes marker features. The tracking apparatus 300 further includes second light supplementing modules 340. The second light supplementing modules 340 are connected to the control module 330 and configured to supplement light during tracking of the tracking target under a control instruction of the control module 330. The number of the second light supplementing modules 340 is same as that of the second acquisition modules 310. Each of the second light supplementing modules 340 supplements light for the scanning operation of the corresponding second acquisition modules 310, thus improving the clarity of the acquired second raw image data.

Figure 6:
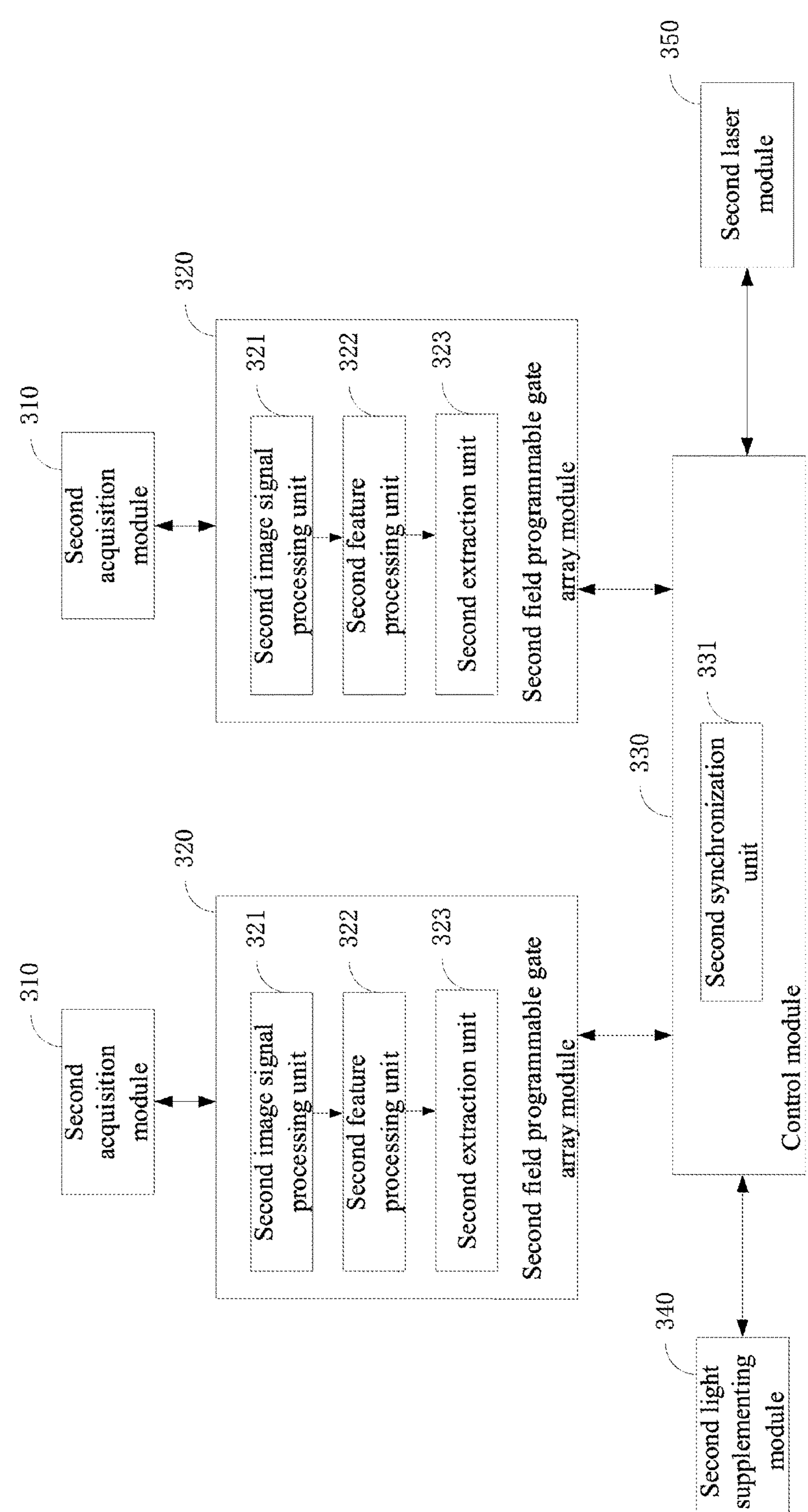
FIG. 6 is a schematic structural diagram of a tracking apparatus according to one or more embodiments.

Referring to FIG. 6, in some embodiments, the tracking apparatus 300 further includes a scanning function. After feature recognition is performed on the acquired second raw image data, the marker features and laser point features may be obtained.

In one or more embodiments, the tracking apparatus 300 further includes second light supplementing modules 340 and a second laser module 350.

The second light supplementing modules 340 are connected to the control module 330 and configured to supplement light for scanning of the tracking target under the control instruction of the control module 330. The number of the second light supplementing modules 340 is same as that of the second acquisition modules 310. Each of the second light supplementing modules 340 supplements light for the scanning operation of the corresponding second acquisition modules 310, thus improving the clarity of the acquired second raw image data.

The second laser module 350 is connected to the control module 330 and configured to project a laser pattern onto the tracking target under a control instruction of the control module 330, so as to form a laser pattern, such as laser lines. It is to be noted that the tracking target here refers to the scanned object. Specifically, the second laser module 350 is configured to project laser light onto the tracking target under the control instruction of the control module 330, so as to form a laser pattern, such as laser lines.

In some embodiments, the tracking apparatus further includes a second storage module. The second storage module is provided in the inner cavity of the tracking apparatus and connected to the control module 330 for receiving and storing the second raw image data. The second storage module is mainly configured to cache the second raw image data. Since the second storage module is also a heat-generating element, by providing the second storage module in the inner cavity, heat of the second storage module may be prevented from being transferred to a lens and affecting the acquisition accuracy of the raw image data.

The three-dimensional scanning system 1000 formed by the various devices described above may be a tracking type three-dimensional scanner.

During scanning, the scanning apparatus in the tracking type three-dimensional scanner is as previously described. A scanning process of the tracking apparatus 300 may be as follows. Initially, the control module 330 establishes a connection with the modeling terminal 200. Then, the two second field programmable gate array modules respectively send configuration information and control instructions to the second acquisition modules 310. Then, the two second field programmable gate array modules 320 respectively perform computational preprocessing on the second raw image data to obtain the valid second feature data. Finally, the valid second feature data is transmitted to the modeling terminal 200 for modeling post-processing to generate the three-dimensional model of the scanning target.

In some embodiments, at least two tracking apparatuses 300 are provided. The at least two tracking apparatuses are 300 are connected to the modeling terminal 200 and configured to acquire third raw image data of respective tracking targets.

The second field programmable gate array modules 320 are configured to perform computational preprocessing on the third raw image data to obtain valid third feature data.

Accordingly, the modeling terminal 200 performs modeling processing based on the first feature data and the third feature data to generate the three-dimensional model. Specifically, by combining the first feature data acquired from the first raw image data and the third feature data acquired from the third raw image data, the scanning data of the scanning target may be converted to the coordinate system of the tracking apparatus, so as to achieve tracking type scanning. It is to be noted that the first feature data in one or more embodiments refers to marker feature data and laser point feature data, and the third feature data refers to marker feature data acquired by the at least two tracking apparatuses described above. In different embodiments, the first feature data and the third feature data specifically refer to different feature data. By providing a plurality of tracking apparatuses 300, the computational efficiency is improved and more accurate data acquisition may be achieved.

The structure of each of the tracking apparatuses 300 is same as the above embodiments, which will not be repeated herein.

It is to be noted that the terms “module”, “unit”, “subunit”, etc. used above may be a combination of software and/or hardware that achieves a predetermined function. Although the apparatuses described are preferably implemented in software in the following embodiments, implementation in hardware, or a combination of software and hardware, is also possible and contemplated. For modules implemented in hardware, the individual modules described above may be located in the same processor, or the individual modules described above may also be located in separate processors in any combination.

One or more embodiments further provide a three-dimensional scanning method. The method is suitable for to the above embodiments and optional implementations, and will not be repeated where it has already been described. The steps illustrated in the following process or in the flow diagram of the accompanying drawings may be performed in a computer system such as a set of computer-executable instructions. Although a logical order is illustrated in the flow diagram, the steps illustrated or described may be performed in a different order from that shown herein in some instances.

Figure 7:
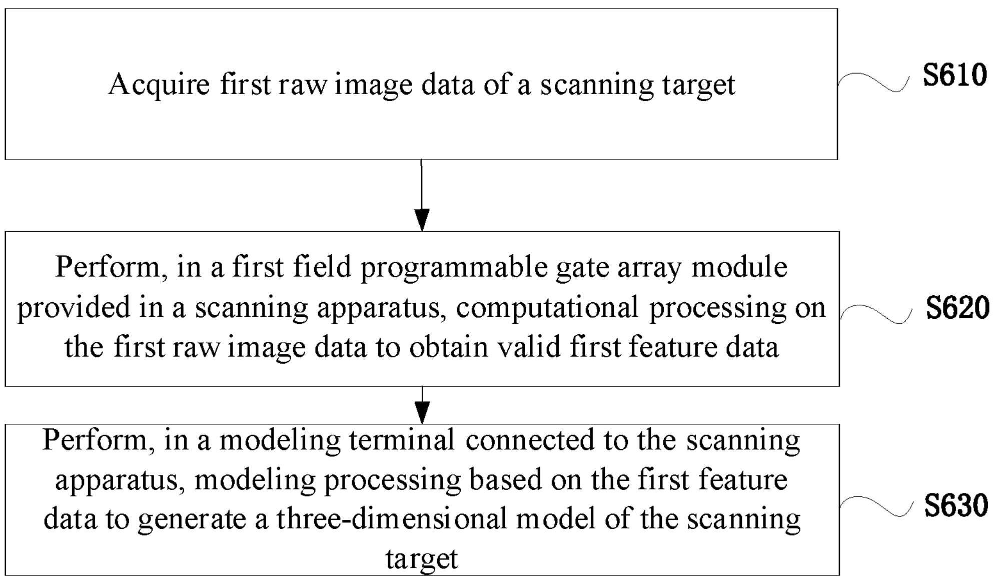
FIG. 7 is a flow diagram of a three-dimensional scanning method according to one or more embodiments.

FIG. 7 is a flow diagram of a three-dimensional scanning method according to one or more embodiments. The method is suitable for the three-dimensional scanning system 1000. The three-dimensional scanning system 1000 is as described above, which will not be repeated herein. As shown in FIG. 7, the method includes the following steps.

In Step S610, first raw image data of a scanning target is acquired.

In Step S620, in a first field programmable gate array module provided in a scanning apparatus, computational preprocessing is performed on the first raw image data to obtain valid first feature data.

In Step S630, in a modeling terminal connected to the scanning apparatus, modeling processing is performed based on the first feature data to generate a three-dimensional model of the scanning target.

Through the above method, configuration requirements for feature data may be further reduced to meet a demand for high-frame-rate scanning.

In some embodiments, performing computational preprocessing on the first raw image data to obtain the valid first feature data (Step S620) includes performing feature recognition on the first raw image data, the feature recognition including marker recognition and/or laser point recognition.

In some embodiments, the method further includes performing image signal processing on the first raw image data and transmitting the processed first raw image data to a first feature processing unit.

In some embodiments, the method further includes performing sub-pixel extraction on a recognition result of feature recognition of the first raw image data.

In some embodiments, the method further includes counting the first raw image data acquired by at least two first acquisition modules, respectively, to cause a first field programmable gate array module to perform synchronous computational preprocessing on the first raw image data acquired at a same time.

In some embodiments, the method further includes: acquiring second raw image data of a tracking target; and performing computational preprocessing on the second raw image data to obtain valid second feature data.

In some embodiments, the method further includes recognizing the second raw image data according to a time stamp corresponding to the second raw image data.

In some embodiments, the method further includes: acquiring third raw image data of respective tracking targets; and performing computational preprocessing on the third raw image data to obtain valid third feature data.

Figure 8:
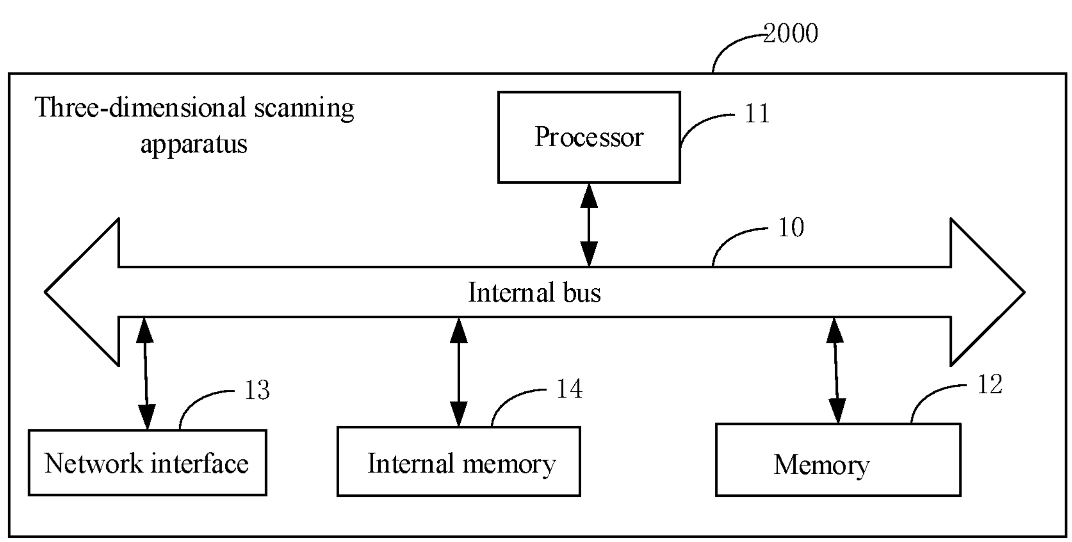
FIG. 8 is a structural diagram of a three-dimensional scanning apparatus according to one or more embodiments.

Referring to FIG. 8, one or more embodiments of the present application provide a three-dimensional scanning apparatus 2000. The three-dimensional scanning apparatus includes a memory 12 and one or more processors 11. Executable codes are stored in the memory 12. The one or more processors 11, when running the executable codes, are configured to implement the three-dimensional scanning method in the above embodiment.

Embodiments of the three-dimensional scanning apparatus 2000 of the present application may be applied to any device having data processing capabilities, which may be a computer and other devices or apparatuses. The device embodiments may be implemented by software, or may be implemented by hardware or a combination of hardware and software. In the case of implementation by software, as an apparatus in a logical sense, the three-dimensional scanning apparatus is formed by reading a corresponding computer program instruction in a non-volatile memory into an internal memory to be run by the processor 11 of the any device having data processing capabilities in which the apparatus is located. From the hardware level, as shown in FIG. 8, which is a hardware structure diagram of any device having data processing capabilities in which the three-dimensional scanning apparatus 2000 according to the present application is located, an internal memory 14, a network interface 13, an internal bus 10, and the memory 12 shown in FIG. 8 in addition to the processor 11. The device having data processing capabilities in which the apparatus of one or more embodiments is located may further include other hardware according to actual functions of the device having data processing capabilities, which will not be repeated herein.

Optionally, the memory 12 may include a mass memory for data or instructions. For example, rather than limiting, the memory 12 may include a hard disk drive (HDD), a floppy disk drive, a solid state drive (SSD), a flash memory, a compact disk, a magneto-optical disk, a magnetic tape, or a universal serial bus (USB) drive, or a combination of two or more of the above. Where appropriate, the memory 12 may include a removable or non-removable (or fixed) medium. Where appropriate, the memory 12 may be provided inside or outside a data processing apparatus. In particular embodiments, the memory 12 is a non-volatile memory. In particular embodiments, the memory 12 includes a read-only memory (ROM), a random access memory (RAM), and a double data rate synchronous dynamic random access memory (DDR SDRAM).

It should be understood that the specific embodiments described herein are intended only to explain the application and not to limit the application. According to the embodiments of the present application, all other embodiments derived by a person of ordinary skill in the art without creative effort fall within the scope of protection of the present application.

Apparently, the accompanying drawings are only some examples or embodiments of the present application, and a person of ordinary skill in the art may also apply the present application to other similar situations based on the drawings without creative effort. Furthermore, it is to be understood that although the work done in this development process may be complex and lengthy, changes in design, manufacture or production, etc., based on the technical content disclosed in the present application are only conventional technical means to a person of ordinary skill in the art and should not be considered insufficient for the disclosure of the present application.

The term "embodiment(s)" in the present application indicates that specific features, structures or characteristics described in conjunction with the embodiments may be included in at least one of the embodiments of the present application. The presence of this phrase at various locations in the specification does not necessarily imply the same embodiments, nor does it imply independent or alternative embodiments to other embodiments that are mutually exclusive. It will be clearly or implicitly understood by those of ordinary skill in the art that the embodiments described in the present application may be combined with other embodiments without conflicts.

The above embodiments express only one or more implementations of the present application, which are described in a specific and detailed manner, but are not to be construed as a limitation of the scope of protection of the patent. It should be pointed out that, for a person of ordinary skill in the art, several deformations and improvements may be made without departing from the conception of the present application, all of which fall within the scope of protection of the present application. Therefore, the scope of protection of the present application shall be subject to the appended claims.

What is claimed is:

1. A three-dimensional scanning system comprising:

a scanning apparatus configured to acquire first raw image data of a scanning target;

a first field programmable gate array (FPGA) module provided in the scanning apparatus and configured to perform computational preprocessing on the first raw image data to obtain valid first feature data; and a modeling terminal connected to the scanning apparatus and configured to perform modeling processing based on the first feature data to generate a three-dimensional model of the scanning target, wherein the scanning apparatus further comprises at least two first acquisition modules and a transmission module, wherein the at least two first acquisition modules are connected to the first FPGA module and configured to scan the scanning target to acquire the first raw image data of the scanning target and transmit the first raw image data to the first FPGA module, and wherein the transmission module is connected to the first FPGA module and configured to transmit the valid first feature data in the first field programmable gate array module to the modeling terminal.

2. The three-dimensional scanning system according to claim 1, wherein the first FPGA module comprises a first feature processing unit configured to perform feature recognition on the first raw image data, the feature recognition comprising marker recognition and/or laser point recognition.

3. The three-dimensional scanning system according to claim 2, wherein the first FPGA module further comprises a first image signal processing unit connected to the first feature processing unit and configured to perform image signal processing on the first raw image data and transmit the processed first raw image data to the first feature processing unit.

4. The three-dimensional scanning system according to claim 2, wherein the first FPGA module further comprises a first extraction unit connected to the first feature processing unit and configured to perform sub-pixel extraction on a recognition result of feature recognition of the first raw image data.

5. The three-dimensional scanning system according to claim 1, wherein the first FPGA module further comprises a first synchronization unit connected to the at least two first acquisition modules and configured to count the first raw image data acquired by the at least two first acquisition modules, such that the first FPGA module performs synchronous computational preprocessing on the first raw image data acquired at a same time.

6. The three-dimensional scanning system according to claim 1, wherein the at least two first acquisition modules are respectively attached to corresponding lenses of the scanning apparatus, and a distance between each of the first acquisition modules and the first FPGA module is not smaller than a first preset threshold.

7. The three-dimensional scanning system according to claim 1, further comprising:

a tracking apparatus connected to the modeling terminal and configured to acquire second raw image data of a tracking target; and second FPGA modules provided in the tracking apparatus and configured to perform computational preprocessing on the second raw image data to obtain valid second feature data.

8. The three-dimensional scanning system according to claim 7, wherein the tracking apparatus further comprises at least two second acquisition modules, and wherein a number of the second FPGA modules is same as a number of the second acquisition modules, and wherein the at least two second acquisition modules are connected to corresponding second FPGA modules and configured to acquire the second raw image data of the tracking target and transmit the second raw image data to the corresponding second FPGA modules.

9. The three-dimensional scanning system according to claim 8, wherein each of the second acquisition modules is attached to a corresponding lens of the tracking apparatus, and wherein a distance between the second FPGA modules and the second acquisition modules is not smaller than a second preset threshold.

10. The three-dimensional scanning system according to claim 8, wherein the tracking apparatus further comprises a control module and a second synchronization unit provided in the control module, and wherein the second synchronization unit is connected to each of the second FPGA modules and configured to recognize the second raw image data according to a time stamp corresponding to the second raw image data.

11. The three-dimensional scanning system according to claim 7, wherein the second FPGA modules comprise second feature processing units configured to perform feature recognition on the second raw image data, the feature recognition comprising marker recognition.

12. The three-dimensional scanning system according to claim 7, wherein at least two tracking apparatuses are provided, wherein the at least two tracking apparatuses are connected to the modeling terminal and configured to acquire third raw image data of respective tracking targets, and wherein the second FPGA modules are configured to perform computational preprocessing on the third raw image data to obtain valid third feature data.

13. A three-dimensional scanning method, comprising:

acquiring first raw image data of a scanning target;

performing, in a first FPGA module provided in a scanning apparatus, computational preprocessing on the first raw image data to obtain valid first feature data; and performing, in a modeling terminal connected to the scanning apparatus, modeling processing based on the first feature data to generate a three-dimensional model of the scanning target, scanning the scanning target to acquire the first raw image data of the scanning target and transmit the first raw image data to the first FPGA module with at least two first acquisition modules connected to the first FPGA module; and transmitting the valid first feature data in the first FPGA module to the modeling terminal with a transmission module connected to the first FPGA module.

14. The three-dimensional scanning method according to claim 13, further comprising performing feature recognition on the first raw image data with a first feature processing unit in the first FPGA module, the feature recognition comprising marker recognition and/or laser point recognition.

15. The three-dimensional scanning method according to claim 14, further comprising performing image signal processing on the first raw image data and transmitting the processed first raw image data to the first feature processing unit with a first image signal processing unit connected to the first feature processing unit.

16. The three-dimensional scanning method according to claim 13, further comprising:

acquiring a second raw image data of a tracking target with a tracking apparatus connected to the modeling terminal; and performing computational preprocessing on the second raw image data to obtain valid second feature data using second FPGA modules provided in the tracking apparatus.

17. The three-dimensional scanning method according to claim 16, further comprising:

acquiring the second raw image data of the tracking target and transmit the second raw image data to a corresponding second FPGA module with at least two second acquisition modules that are connected to corresponding second FPGA modules, wherein a number of the second FPGA modules is same as a number of the second acquisition modules.

18. The three-dimensional scanning method according to claim 16, further comprising:

acquiring third raw image data of respective tracking targets with at least two tracking apparatuses are connected to the modeling terminal; and performing computational preprocessing on the third raw image data to obtain valid third feature data with the second FPGA modules.

* * * * *